(12) United States Patent
Gropallo

(10) Patent No.: US 7,451,908 B2
(45) Date of Patent: Nov. 18, 2008

(54) FURNACE BRAZING PROCESS

(75) Inventor: Francesco Gropallo, Milan (IT)

(73) Assignee: Consulnet Italia S.r.l., Milan (IT)

( * ) Notice: Subject to any disclaimer, the term of this patent is extended or adjusted under 35 U.S.C. 154(b) by 401 days.

(21) Appl. No.: 10/735,177

(22) Filed: Dec. 12, 2003

(65) Prior Publication Data

US 2004/0124232 A1 Jul. 1, 2004

(30) Foreign Application Priority Data

Dec. 12, 2002 (IT) .......................... MI2002A2630

(51) Int. Cl.
*B23K 31/02* (2006.01)

(52) U.S. Cl. ...................... 228/183; 228/246

(58) Field of Classification Search ........................ None
See application file for complete search history.

(56) References Cited

U.S. PATENT DOCUMENTS

| | | | |
|---|---|---|---|
| 1,662,068 A * | 3/1928 | Ironside ...................... 220/752 |
| 1,889,974 A * | 12/1932 | Chamberlain ............... 228/135 |
| 2,157,918 A * | 5/1939 | Rankin ........................ 285/192 |
| 2,901,529 A * | 8/1959 | Rudner .................... 174/152 R |
| 2,959,844 A * | 11/1960 | Selke .................... 29/890.043 |
| 3,291,962 A * | 12/1966 | Walker ................... 219/137 R |
| 3,310,869 A * | 3/1967 | La Porte et al. .......... 29/890.03 |
| 3,496,629 A * | 2/1970 | Martucci et al. ............ 228/168 |
| 3,565,117 A * | 2/1971 | Schmunk .................... 138/109 |
| 3,786,275 A * | 1/1974 | Quesinberry et al. ............ 361/2 |
| 3,800,888 A * | 4/1974 | Warrington .................. 173/131 |
| 3,871,063 A * | 3/1975 | Halvorsen .............. 29/890.143 |
| 4,519,537 A * | 5/1985 | Heinrich et al. ............. 228/221 |
| 4,529,034 A * | 7/1985 | Saperstein ............... 165/134.1 |
| 4,608,321 A * | 8/1986 | Sato et al. .................... 428/632 |
| 4,628,294 A * | 12/1986 | Parker et al. ................. 337/248 |
| 5,127,110 A * | 7/1992 | Monch .......................... 4/696 |
| 5,360,158 A * | 11/1994 | Conn et al. ................ 228/56.3 |
| 5,540,278 A * | 7/1996 | Chiba et al. ................. 165/175 |
| 5,566,853 A * | 10/1996 | Schenker et al. ............ 220/581 |
| 5,617,992 A * | 4/1997 | Huddleston et al. ......... 228/183 |
| 6,213,379 B1 * | 4/2001 | Takeshita et al. ......... 228/112.1 |
| 6,543,675 B1 * | 4/2003 | Laudic et al. ............... 228/183 |
| 6,604,669 B1 * | 8/2003 | Syslak et al. ................ 228/166 |
| 6,786,275 B2 * | 9/2004 | Dey et al. .................... 165/173 |

FOREIGN PATENT DOCUMENTS

| | | | |
|---|---|---|---|
| DE | 198 23 635 A1 | * | 12/1999 |
| EP | 0422612 A | * | 4/1991 |
| GB | 2092692 A | * | 8/1982 |
| GB | 2092692 A | * | 8/1982 |
| JP | 403060862 A | * | 3/1991 |
| JP | 410230356 A | * | 9/1998 |

* cited by examiner

*Primary Examiner*—Kiley Stoner
(74) *Attorney, Agent, or Firm*—Abelman, Frayne & Schwab

(57) ABSTRACT

A furnace brazing process for metal parts of which at least one part is tubular, includes positioning of the filler metal, preferably as a pre-formed member inside said tubular part, and successive reheating inside the furnace to induce the melting of the filler metal and the accomplishment of the joint. The process is particularly suited to the construction of towel-rack type radiators.

10 Claims, 2 Drawing Sheets

FURNACE BRAZING PROCESS

FIELD OF THE INVENTION

The present invention relates to a brazing process, in particular of elements poorly accessible from the outside such as tubes, more in particular for the joining of elements constituting a "towel-rail" or towel rack type radiator. The process, according to a preferred aspect is a furnace brazing process.

PRIOR ART

Brazing is a system commonly used to permanently join two metal parts (metal which may be non ferrous or ferrous, such as steels with various carbon contents). The junction takes place thanks to a thin layer of a metal, different from the material making up the parts to join together, called deposit or filler metal. The filler metal has a lower melting point than that of the material to be joined, and the area involved in brazing is taken to a temperature at which the filler metal melts. Generally the molten filler metal penetrates by capillary action into the clearance between the two parts to join together, forming the layer which, once solidified, forms the joint.

Two main brazing technologies exist, which are differentiated by the method of supplying heat to cause the fusion of the filler metal: flame brazing, by which the area of the junction is heated directly and locally, where the filler material has been placed, and furnace brazing, where the parts to be joined are introduced after the filler metal has been placed in the area of the junction in an appropriate manner. Inside the furnace, the parts are brought to the temperature at which the fusion of the filler metal occurs. The heating may take place in a gradual manner and affects all of the parts to be joined and not just the area affected by the junction. Also the cooling is normally carried out in a gradual manner, also in order not to induce stresses or damage to the parts to be treated. The furnace may comprise several chambers through which the parts to be treated are led on a conveyor belt suitably constructed to resist to the heat, or by adequate mechanical means of another type.

The systems for positioning the filler metal in the appropriate location are various; for example metal wires suitably folded to adapt to the characteristics of the site concerned may be used. Or pastes made up of metal powder combined with an appropriate binder are generally used; in many cases, in fact, the structure of the joint does not allow a precise positioning of the filler metal in wire form.

A field of application of brazing is in the joining of tubular elements to each other, such as occurs for example in the joining together of one pipe to another pipe, or with elements of another type, such as for example closing stoppers for the ends of tubes. In this case it is required that a liquid tight junction is achieved. An application of particular interest is in the production of towel-rail or towel rack type radiators, commonly used in domestic heating. This type of radiator typically comprises two tubular manifolds parallel to each other, joined transversally by a series of tubes (generally forming a structure which resembles a ladder); a fluid, usually water, may enter from one end of a manifold and exit from the opposite end of the other manifold after being circulated through the transversal tubes. The points subjected to brazing, which must also ensure an adequate liquid seal, are the connections of the tubes into the manifolds, and the ends of the manifolds which are closed by appropriate stoppers (metal plates of an appropriate form).

For steel radiators, a copper based paste is normally used, which is applied to the joints externally, then the brazing takes place in the furnace. The process is unsatisfactory for various reasons: the filler material must be able to disperse throughout the joint, to give an even distribution and it is difficult to position it in a correct manner. This operation is normally performed manually by an operator and is therefore reproducible with difficulty, and therefore, the metal is dosed in a large excess, with waste of material, the possibility of obtaining irregular surfaces and, in any case, bad diffusion throughout the junction. This results in that there is a considerable percentage of rejections (frequently due to inadequate liquid sealing). The external positioning also entails the possibility that the molten filler material drips away, thus damaging some parts of the furnace, such as the conveyor belt.

The use of welding pastes, which is normally preferred due to the difficulties with positioning, and is necessary in the case of the stoppers of the manifolds, may bring about drawbacks such as the presence of impurities such as leaving carbonaceous residues, during and following brazing, which may compromise the quality of the joint. In addition, the metal in a paste is necessarily diluted in a binding agent, which reduces the concentration of metal in the relevant zone in the proximity of the joint, with greater dispersion of the metal during the formation step of the joint.

Welding pastes, in addition, and above all the pastes containing different metals, have a production cost, which may be considerable, with respect to the metal they contain. Since they imply a production process involving specific machinery, they must generally be selected from those available on the market, which limits the choice of the filler metal to a reduced range of metal containing compositions, since it is often too expensive to produce or get produced a paste of non-commercial composition, whilst the usable metals (by which term it is intended to mean meals or alloys) are generally available in high purity (such as for example in the form of metal wires or powders) in a wide range of compositions, with high qualitative standards.

SUMMARY

The problems set forth above have now been solved through the brazing process of the invention to join two metal parts, of which at least one of which parts is tubular, the process comprising:
- positioning a filler metal on one of said metal parts;
- fixedly aligning the metal parts in the position in which they are to be joined;
- heating said metal parts to a temperature at which the filler metal melts;

wherein said filler metal is positioned proximate the tubular metal part prior to melting.

According to a preferred embodiment of the invention, heating is carried out in a furnace.

According to a further preferred aspect of the invention, the filler metal is in the form of preformed object, which may be, for example, an appropriately folded metal wire or a moulded object of appropriate shape, preferably a thin ring.

According to a particularly preferred aspect of the invention, the parts to be joined are the metal parts of a towel-rail type radiator. For example, the parts can be a tube and a tubular manifold, where the tube is to be brazed in a hole in one of the lateral surfaces, preferably a flat surface of the manifold. Or the part can be a stopper inserted in one end of the manifold to close it. In this latter case, according to a preferred aspect of the invention, the stopper has an external perimeter which is substantially the same in shape and dimensions as the external perimeter of the manifold.

According to another preferred aspect it has a step on the internal face that is proximate the manifold once the joint is made, the outer edge of which has the shape and dimensions to enter inside the manifold, leaving between itself and the internal walls of the manifold appropriate clearance to create a joint for brazing. The stopper has an internal face, in correspondence to which it is provided with means for retaining the preformed filler metal in proximity to the junction to be brazed, for example in proximity to said step in general in proximity to the surface destined to form, with the manifold, the joint to be brazed. Preferably said means are a housing formed in the internal face, along the edge of the step.

The invention also relates to a stopper as described above.

BRIEF DESCRIPTION OF THE DRAWINGS

The invention will be illustrated by the detailed description of preferred, but not exclusive, embodiments, which are given by way of examples only, with the aid of the attached drawings in which.

DETAILED DESCRIPTION OF A PREFERRED EMBODIMENT

Figure 1:
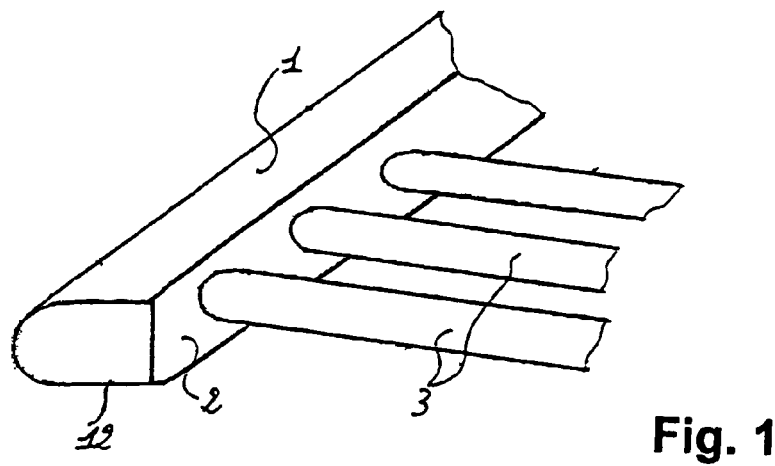
FIG. 1 a detail of a towel-rail type radiator.

With reference to FIG. 1, a detail of a towel-rail type radiator may be observed in which a tubular manifold 1 may be noted. Preferably, the manifold has a flat surface 2 on which are formed an array of holes such as to receive the ends of the tubes 3, leaving a clearance suitable to create a connection by brazing between the manifold and the tubes, so as to create the piece of which a detail is depicted. The tubes may be tapered at the ends so as to ease their insertion to a correct depth. Sometimes the ends are refashioned after they have been inserted, by an appropriate machine which is inserted into the manifold from one end.

According to a first aspect of the invention, the filler metal is positioned onto the external surface of the end of the tubes, which is then inserted into the hole in the appropriate position, so as that the filler metal finds itself inside the manifold in proximity to the junction to be brazed, so as to be able to be drawn by capillary action into the clearance space in said junction once melted. The tubes and the manifolds are inserted into the furnace to cause the melting of the filler metal.

Figure 2:
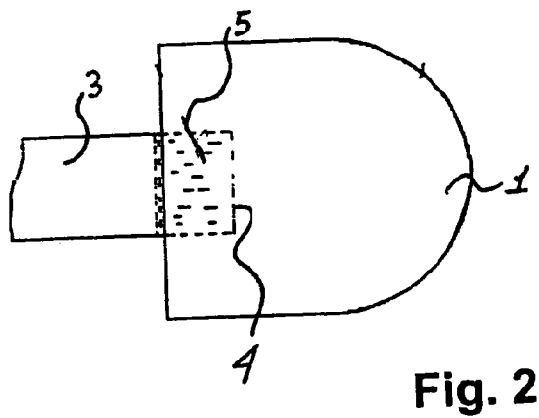
FIG. 2 schematically illustrates a detail of the tube of a towel-rail type radiator inserted into a manifold to form a brazed junction.

Generally, a completely assembled radiator is inserted into the furnace, which exits as the finished product following cooling and the solidification of the filler metal. The filler metal may be positioned in various modes. For example, a coating 5 constituted by a thin sheet of the filler metal (for example a metal laminate) may be applied or deposited around the end 4 of the tube 3, as shown in FIG. 2.

Figure 3:
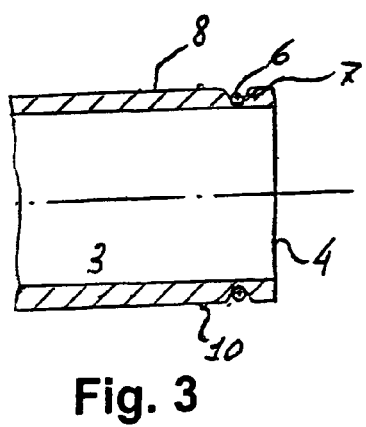
FIG. 3 schematically illustrates in cross-section a detail of a tube of a towel-rail type radiator prepared for brazing with the positioning of the filler material.

According to a preferred aspect of the invention the filler metal is positioned in preformed shape, for example a ring of metal wire to be placed around the end of the tube. Still more preferably, the ring 6 will be placed at a special groove 7 (see FIG. 3) formed around the end 4 of the tube (for example by engraving onto the external surface 8 of the tube). The ring may be an open ring, in order to facilitate positioning.

Figure 4:
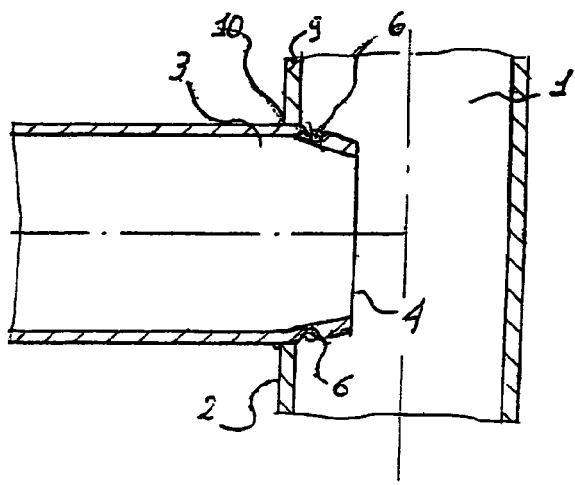
FIG. 4 schematically illustrates in cross-section a detail of a tube of a towel-rail type radiator prepared for brazing with the positioning of the filler material, inserted into a manifold.

In FIG. 4 is represented the tube 3 inserted into a hole in the surface 2 of the manifold 1, prior to the heating step, the ring must find itself in proximity with the junction, in such a way that it can be drawn by capillary action into the clearance between the walls 9 of the manifold and the tube 3. The end 4 of the tube 3 will protrude for a short length into the manifold, for example for a length of between 1 and 3 mm, for example 2 mm. The filler metal, if deposited prior to the insertion of the tube 3 into the manifold 1 will have to be able to pass inside the hole.

Advantageously, the groove 7 will have a sufficient depth to accommodate the metal preformed shape so as that it does not protrude from the surfaces 8. Or, the end of the tube may be tapered, which will also facilitate correct insertion, which, if the tapering is sufficient may render the presence of the groove 7 not necessary. In such a case, the filler metal must have such a shape as to allow it to stay in position around the tube, for example, it may be a ring which tightens around the surfaces of the tube by elasticity, or a coating (or a welding paste), or a spiral ring, which has the advantage of being able to enlarge without leaving parts of the tube perimeter uncovered.

Advantageously, the tapering and the presence of a groove may be combined in an appropriate manner. To ensure the correct insertion of the tube, a guide 10 on the surface 8 of the tube may also be provided, for example a ring shaped ridge which impedes further insertion of the tube.

It is also possible that the positioning of the filler metal follows the mutual positioning of the metal parts to be joined.

In the case of the tube to be fixed to the manifold, for example, a ring may be placed on the end of the already inserted tube by special machinery.

It is in any case possible to refashion the ends of the tubes from inside, according to known methods, with the filler metal positioned; this favours the maintenance of the positions by the metal, beyond the correct positioning of the junction.

The positioning of the filler material in the shape of a preformed object is suitable to being performed automatically, in contrast to the positioning of the filler material, in particular if in paste form to the exterior of the junction.

Figure 5:
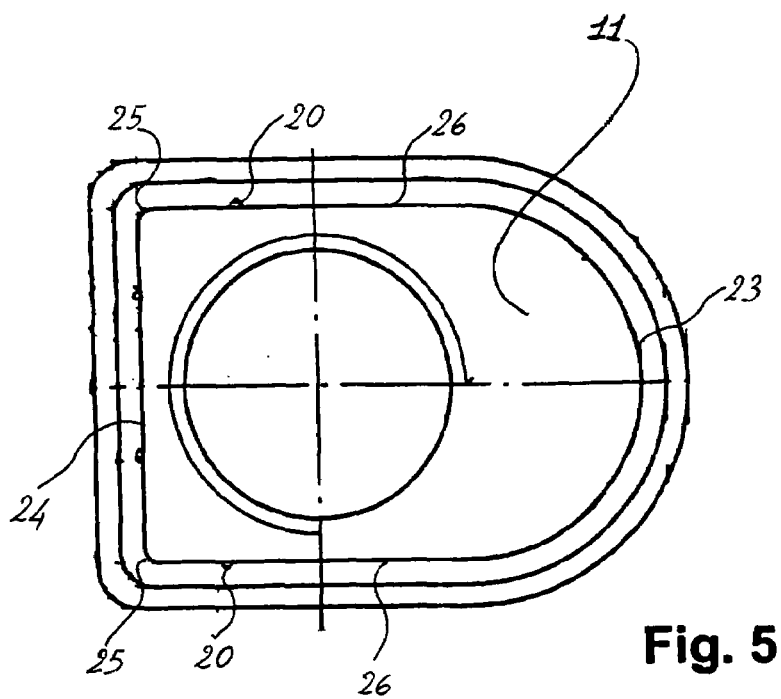
FIGS. 5 and 6 schematically illustrate a stopper for closing the manifold of a towel-rail type radiator viewed from the inner side and in lateral section.
Figure 6:
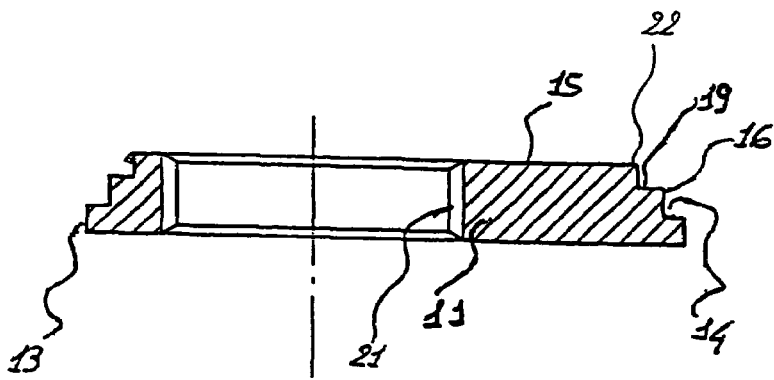

In FIGS. 5 and 6 is represented a stopper 11, according to a particular aspect of the invention, for the closure of the end 12 of a manifold 2.

Figure 7:
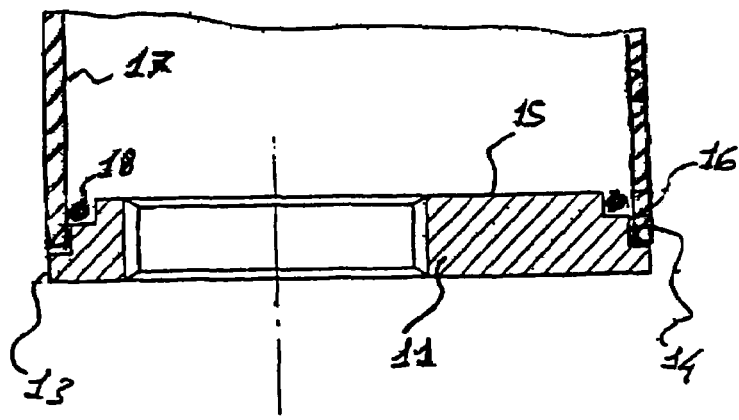
FIG. 7 schematically illustrates, in lateral section, a stopper inserted into a manifold, ready for brazing.

The outer edge 13 may advantageously have the external profile of the transverse section of the manifold. Toward the internal face 15 of the stopper and thereon, a step 14 will be formed, the external surface of which 16 may enter inside the manifold; between the internal surface 17 of the manifold and said surface 16 the clearance will be located into which the molten filler material must be drawn (see FIG. 7).

In a manner analogous to the step 14, still towards the interior face a housing 19 may be formed, suitable for receiving a preformed object 18 of filler material (which may be a ring of appropriately shaped metal wire). It may be held in place, analogously to the rings used for the tube, by its own elasticity and/or by special means, such as projections 20, formed for example by punching on the interior face 15 of the stopper, near to the edge of the housing 19. Such housing, with or without projections in this case represents the means for holding the filler metal in position.

According to a preferred embodiment, the projections for holding in place a preformed object, especially when it has the shape of an open ring, may extend continuously over a portion of the edge 22 of the inner face 15 of the stopper 11.

For example, when the stopper has the shape shown in FIG. 5, with said edge 22 having a semicircular or rounded portion 23 opposite to a linear portion 24 delimited by two (rounded) corners 25, a continuous projection may extend over the whole portion 23 and over the corners 25 (it may or may not also extend over the linear portion 24), while the middle portions 26 are left without projection. This facilitates the insertion of the open ring shaped preformed object, which is particularly advantageous when this operation must be done by machine.

The person skilled in the art may find, according to what exemplified above, other possible ways to implement the projections on stoppers having the shape shown in FIG. 5 or other shapes, in order to have an easy insertion of the preformed object of filler metal.

The stopper may have one or more threaded holes 21 or be blind, depending on whether the involved end of the manifold must be connected to tubing or not. As may be seen from FIG. 7, the housing 19 is delimited by the interior surface 17 of the manifold and the filler metal will have few possibilities for dispersion once melted, increasing the efficacy of the process.

In general, copper based alloys are used to weld steel elements, in the construction of radiators.

If preformed shapes of filler metal are used, as mentioned, then it is possible to have a wide range of compositions available. This allows for them to be selected on the basis of the product process and quality requirements. For example lower melting alloys may be used instead of those of current practice, thus reducing the temperature of the furnace. This may reduce the mechanical tensions on the finished product and eliminate the need to correct deformations due to heating.

The surfaces will result of better quality, even in view of further treatments such as chrome plating. Or, coloured alloys, suited to the colour of the mechanical parts to be joined may be selected, such as for example those based on copper-nickel or copper-silver if the material of the parts to be joined is, for example stainless steel. If aluminium parts are to be joined an aluminium-silicon alloy may be selected as the filler metal, which would easily allow the construction of aluminium radiators.

If the type of filler metal requires it, such as for example in the case of zinc or aluminium based alloys, such as aluminium-silicon, it is possible to use preformed objects provided with a deoxidiser. For example metal wire shaped preformed objects with deoxidant cores may be used. The rings of metal may be obtained by cutting wire from a coil, if necessary they may be appropriately folded for example in a mold, like the rings for the stoppers of the manifold.

The metal wire may be selected of adequate diameter, for example, from 0.5 to 2 mm, for example 1 mm.

The process, as mentioned, is suitable for the construction of towel-rail type radiators, where the dimensions of the tubular parts to be joined are such as to render them difficult to be accessed from inside. For example the manifolds may have widths from 20 to 50 mm, the tubes appropriately lower diameters for example, between 10 and 30 mm. The tubes also have frequently sections other than rounded, for example oval sections; in such a case, the preformed objects may have the adequate conformations. The thicknesses of the metals may vary, for example, between 0.5 and 2 mm.

It is however intended that the process may also find other applications different from those exemplified, without departing from the scope of protection of the claims.

According to a preferred aspect of the invention, the process is a furnace brazing process. It is, however, possible that the heat be supplied to the junction by another method, for example through application of a torch, gas flames, electric radiant heat, of the like.

The invention claimed is:

1. A brazing process to join two metal parts (1, 11), said metal parts including a stopper (11) and a tubular manifold (1) having an end with an opening, wherein said stopper is brazed to close the open end (12) of said tubular manifold (1), said stopper having an internal face (15) provided with a housing (19) formed in the external edge (13) of the stopper and surrounding the internal face (15), the housing configured to receive a filler metal (18), said process comprising:

positioning a portion of filler metal (18) on the stopper in housing (19);

fixedly aligning the metal parts to be joined, wherein said internal face (15) and the filler metal (18) are both positioned inside said tubular manifold (1) prior to melting; and heating said metal parts (1, 11) to a temperature at which the filler metal (18) melts and is contained entirely within the tubular manifold, thereby forming a bond between the stopper and the internal surface of the adjacent manifold.

2. The process according to claim 1, wherein said positioning of a filler metal (18) includes holding the filler metal (18) in proximity to the junction to be brazed by a plurality of projections (20) formed on the internal face (15) proximate the edge (13) of the housing (19) of the stopper.

3. The process according to claim 1, wherein a portion of the housing (19) includes a step (14) that is inserted in said tubular manifold, wherein said step (14) forms a junction that is in contact with an internal surface (17) of the manifold to be brazed.

4. The process according to claim 1 wherein, the metal parts to be joined are parts of a towel-rack radiator.

5. A brazing process to join two metal parts, said metal parts including (i) a tube (3) having an end (4) and (ii) a tubular metal part (1) delimiting an internal cavity and having a lateral wall (2) with an inner wall surface, a hole in the lateral wall (2) communicating with said internal cavity, said hole configured to receive the end (4) of tube (3) in close-fitting relation, a brazing filler metal in the form of a preformed metal wire ring (6) being positioned around the end of said tube (3) in a groove (17) formed in the tube, the process comprising the steps of:

fixedly aligning the metal parts to be joined with the portion of the metal tube (3) with said filler metal (6) positioned within said internal cavity of tubular metal part (1) and proximate the inner wall surface, prior to melting;

heating said metal parts to a temperature at which the filler metal melts, whereby a brazed joint is formed between the two metal parts.

6. The process according to claim 5, wherein said heating step is carried out in a furnace.

7. The process according to claim 5, wherein a coating (5) of filler metal is applied to, or deposited around the end of said tube and the end of the tube is then inserted into said hole.

8. The process according to claim 5, wherein the end of said tube is tapered.

9. The process according to claim 5, wherein the end of said tube is inserted into said hole so as to protrude into the inside of said tubular part a distance of from 1 to 3 mm.

10. A brazing process to join two metal parts, said metal parts including (i) a tube (3) having an end (4) and (ii) a tubular metal part (1) delimiting an internal cavity, the tubular metal part having a lateral wall (2) with an inner wall surface, at least one hole in the lateral wall (2) communicating with said internal cavity configured to receive the end (4) of tube (3) in close-fitting relation, the process comprising the steps of:

positioning a brazing filler metal (5,6) on the end (4) of said tube (3);

fixedly aligning the metal parts to be joined with the portion of the metal tube (3) with said filler metal positioned within said internal cavity proximate the inner wall surface of tubular member (1) prior to melting;

reconfiguring the shape of the end of the metal tube (3) after it has been inserted into the hole;

heating said metal parts to a temperature at which the filler metal melts, whereby the two metal parts are joined by a brazed joint formed between the two metal parts.

* * * * *